United States Patent Office 3,299,062
Patented Jan. 17, 1967

3,299,062
HYDRAZIDES OF 3-PHENYLCINNOLINE-4-CARBOXYLIC ACIDS
Harman S. Lowrie, Glenview, Ill., assignor to G. D. Searle & Co., Chicago, Ill., a corporation of Delaware
No Drawing. Filed May 6, 1965, Ser. No. 453,806
6 Claims. (Cl. 260—250)

The present invention relates to a group of hydrazides of 3-phenylcinnoline-4-carboxylic acids. More particularly, it relates to a group of compounds which can be represented by the following general formula

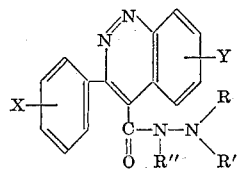

wherein X and Y are selected from the group consisting of hydrogen, methyl, methoxy, and halogen; —NRR' is selected from the group consisting of amino, di(lower alkyl)amino, 1-pyrrolidinyl, piperidino, morpholino, and 4-methyl-1-piperazinyl; and R'' is selected from the group consisting of hydrogen and methyl. The halogens referred to above include fluorine, chlorine, bromine, and iodine. The lower alkyl radicals referred to above contain up to 6 carbon atoms and can be exemplified by methyl, ethyl, propyl, butyl, and the like.

The organic bases of this invention form nontoxic addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of this invention are prepared by the reaction of the appropriate hydrazine with a 3 - phenylcinnoline-4-carbonyl halide. The acid chloride is preferred for this reaction. It can be readily prepared from the appropriate carboxylic acid by reaction with thionyl chloride.

The compounds of the present invention are useful because of their pharmacological properties. In particular, the compounds of this invention are useful because they affect the central nervous system and, more particularly, because they have a depressant effect on the central nervous system. These compounds do not show a hypotensive effect.

Those compounds in which —NRR' is amino are useful as intermediates in the preparation of hydrazones. Thus, a hydrazide of this type can react with acetone to give the corresponding isopropylidene derivative. Such hydrazones possess anti-inflammatory activity.

The following examples are presented to further illustrate the invention; they should not be construed as limiting it in spirit or in scope. In these examples, quantities are indicated in parts by weight, and temperatures in degrees centigrade (° C.).

Example 1

A solution of 2.7 parts of 3 - phenylcinnoline - 4 - carbonyl chloride in 65 parts of methylene chloride is added portionwise to a solution of 6 parts of 95% hydrazine ("anhydrous") in 130 parts of methylene chloride. The mixture is allowed to stand for 16 hours before it is extracted with dilute potassium hydroxide solution. The alkaline extract is then made acidic and the yellow solid which precipitates is separated by filtration, washed well with water, and dried. The solid is then recrystallized twice from benzene to give yellow prisms of 3-phenylcinnoline - 4 - carboxylic acid hydrazide melting at about 198–200° C. This hydrazide is soluble in dilute potassium hydroxide solution and it can be precipitated therefrom by saturating the solution with carbon dioxide. The hydrazide of this example has the following formula

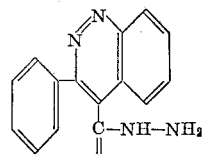

Example 2

If hydrazine is reacted with 3-(4-chlorophenyl)cinnoline-4-carbonyl chloride and 3-(4-methoxyphenyl)cinnoline-4-carbonyl chloride according to the procedure described in Example 1, the products obtained are, respectively, 3 - (4-chlorophenyl)cinnoline - 4 carboxylic acid hydrazide and 3 - (4 - methoxyphenyl)cinnoline - 4 - carboxylic acid hydrazide.

Example 3

1 part of 3 - phenylcinnoline - 4 - carboxylic acid hydrazide is dissolved in acetone and refluxed for 1 hour. When the solution is cooled, a yellow powder precipitates; it melts at about 201–203° C. The product obtained in this way is 1 - (3 - phenylcinnoline - 4 - carbonyl) - 2 - isopropylidene hydrazine.

Example 4

5.4 parts of 3 - phenylcinnoline - 4 - carbonyl chloride is added to 6 parts of 1,1 - dimethylhydrazine in 270 parts of methylene chloride. The mixture is allowed to stand for 2 days and then washed with water at a pH of 5–6. The solution is then dried by shaking it with a saturated aqueous solution of sodium chloride followed by filtration through anhydrous potassium carbonate. The solvent is evaporated from the dried solution and the resultant residue is then stirred with ether. The crystalline product is then filtered and recrystallized from methanol to give 1,1 - dimethyl - 2 - (3 - phenylcinnoline - 4 - carbonyl) hydrazine melting at about 237–240° C.

If 1,1-diethylhydrazine is substituted for the 1,1-dimethylhydrazine and the above procedure is repeated, the product obtained is the corresponding diethyl hydrazide.

Example 5

The reaction mixture is prepared by the addition of 5.4 parts of 3-phenylcinnoline-4-carbonyl chloride to a solution of 4.6 parts of 1-amino-4-methylpiperazine and 2 parts of triethylamine in 270 parts of methylene chloride. The mixture is allowed to stand for 2 days and it is then washed with dilute potassium carbonate solution. It is then dried by shaking with saturated aqueous sodium chloride solution and then filtering through anhydrous potassium carbonate. The dried solution is stirred with ether and then filtered to remove the precipitated solid. This is recrystallized from a mixture of acetone and hexane to give a yellow powder which is N-(4-methyl-1-piperazinyl)-3-phenylcinnoline-4-carboxamide melting at about 216–218° C.

If the above procedure is repeated using N-aminopiperidine in place of the 1-amino-4-methylpiperazine, the product is N-piperidino-3-phenylcinnoline-4-carboxamide.

Example 6

A solution of 5.4 parts of 3-phenylcinnoline-4-carbonyl chloride in 60 parts of methylene chloride is added to 7.4 parts of 1,1,2-trimethylhydrazine in 135 parts of methylene chloride. The mixture is allowed to stand for 15 hours before it is washed with dilute potassium hydroxide solution, then with dilute hydrochloric acid, and finally with water. The resultant solution is dried by shaking it with a saturated aqueous solution of sodium chloride and then filtering the solution through anhydrous potassium carbonate. The solvent is evaporated from the dried solution under reduced pressure and the resultant residue is recrystallized from methanol to give 1,1,2-trimethyl-2-(3-phenylcinnoline-4-carbonyl)hydrazine as yellow prisms melting at about 191–194° C. This compound has the following formula

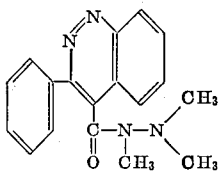

What is claimed is:
1. A compound of the formula

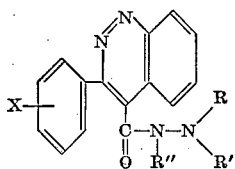

wherein X is selected from the group consisting of hydrogen, chlorine, and methoxy; NRR' is selected from the group consisting of amino, di(lower alkyl)amino, piperidino, and 4-methyl-1-piperazinyl; R'' is selected from the group consisting of hydrogen and methyl.

2. 3-phenylcinnoline-4-carboxylic acid hydrazide.
3. A compound of the formula

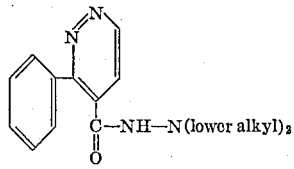

4. 1,1-dimethyl-2-(3-phenylcinnoline-4-carbonyl)hydrazine.
5. 1,1,2-trimethyl-2-(3-phenylcinnoline-4-carbonyl)hydrazine.
6. N-(4-methyl-1-piperazinyl)-3-phenylcinnoline-4-carboxamide.

No references cited.

ALEX MAZEL, *Primary Examiner.*
HENRY R. JILES, *Assistant Examiner.*

UNITED STATES PATENT OFFICE
CERTIFICATE OF CORRECTION

Patent No. 3,299,062                                    Janaury 17, 1967

Herman S. Lowrie

It is hereby certified that error appears in the above numbered patent requiring correction and that the said Letters Patent should read as corrected below.

Column 4, lines 8 to 14, the formula should appear as shown below instead of as in the patent"

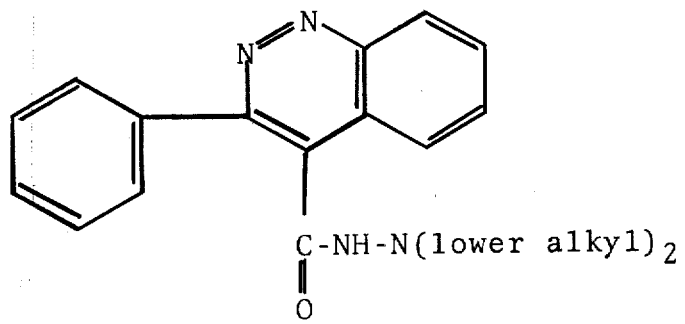

Signed and sealed this 24th day of October 1967.

(SEAL)
Attest:

EDWARD M. FLETCHER, JR.                      EDWARD J. BRENNER
Attesting Officer                              Commissioner of Patents